(12) United States Patent
Nashimoto

(10) Patent No.: US 11,044,444 B2
(45) Date of Patent: Jun. 22, 2021

(54) IMAGE CAPTURING DEVICE AND IMAGE CAPTURING METHOD

(71) Applicant: JVCKENWOOD Corporation, Yokohama (JP)

(72) Inventor: Hiroaki Nashimoto, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/801,876

(22) Filed: Feb. 26, 2020

(65) Prior Publication Data
US 2020/0280703 A1 Sep. 3, 2020

(30) Foreign Application Priority Data

Feb. 28, 2019 (JP) .............................. JP2019-036438
Mar. 26, 2019 (JP) .............................. JP2019-058297

(51) Int. Cl.
| | |
|---|---|
| *H04N 7/18* | (2006.01) |
| *B60R 11/04* | (2006.01) |
| *B61D 49/00* | (2006.01) |
| *H04N 5/225* | (2006.01) |
| *B60R 11/00* | (2006.01) |

(52) U.S. Cl.
CPC ............. *H04N 7/188* (2013.01); *B60R 11/04* (2013.01); *H04N 5/2253* (2013.01); *B60R 2011/0026* (2013.01); *B60R 2011/0056* (2013.01); *B61D 49/00* (2013.01)

(58) Field of Classification Search
None
See application file for complete search history.

(56) References Cited

U.S. PATENT DOCUMENTS

| | | | |
|---|---|---|---|
| 7,195,267 B1 * | 3/2007 | Thompson | B60D 1/36 280/477 |
| 10,326,921 B2 * | 6/2019 | Chien | G01J 5/089 |
| 2002/0159270 A1 * | 10/2002 | Lynam | B60Q 1/2665 362/492 |
| 2006/0171453 A1 * | 8/2006 | Rohlfing | G08B 13/19656 375/240.01 |
| 2016/0100086 A1 * | 4/2016 | Chien | G01J 5/089 348/143 |
| 2018/0284735 A1 * | 10/2018 | Cella | H04L 1/0041 |
| 2019/0121350 A1 * | 4/2019 | Cella | H04L 67/12 |
| 2019/0324431 A1 * | 10/2019 | Cella | G05B 19/4185 |
| 2019/0339688 A1 * | 11/2019 | Cella | G05B 19/41865 |
| 2019/0366554 A1 * | 12/2019 | Breugelmans | G05D 1/0231 |
| 2019/0389082 A1 * | 12/2019 | Higo | B25J 9/1697 |

(Continued)

FOREIGN PATENT DOCUMENTS

JP    H11-69211 A    3/1999

*Primary Examiner* — Reza Aghevli
(74) *Attorney, Agent, or Firm* — Procopio, Cory, Hargreaves & Savitch LLP

(57) ABSTRACT

An image capturing device according to one embodiment includes a camera unit configured to capture images of a surrounding environment and generate image data, a suction-attachment unit configured to support the camera unit and be fixed on a suction-attachment subject surface by a user, a determination unit configured to determine whether or not the image data can be output to a recording unit, and a controller configured to control output of the image data to the recording unit, based on a determination result by the determination unit.

10 Claims, 8 Drawing Sheets

(56) References Cited

U.S. PATENT DOCUMENTS

2020/0103894 A1\* 4/2020 Cella .................... H04B 17/309
2020/0133254 A1\* 4/2020 Cella .................... G05B 13/028
2020/0225655 A1\* 7/2020 Cella .................... G06N 3/0472

\* cited by examiner

IMAGE CAPTURING DEVICE AND IMAGE CAPTURING METHOD

CROSS REFERENCE TO RELATED APPLICATION

This application is based upon and claims the benefit of priority from Japanese patent applications No. 2019-036438, filed on Feb. 28, 2019, and No. 2019-058297, filed on Mar. 26, 2019, the disclosures of which are incorporated herein in its entirety by reference.

BACKGROUND

The present disclosure relates to an image capturing device and an image capturing method.

In recent years, small-sized image capturing devices for recording a surrounding environment, such as a wearable camera and an action camera, have been known. In Japanese Unexamined Patent Application Publication No. H11-69211, an electronic camera that is, by being attached on a windowpane of a moving vehicle, such as a car and a train, or a building, capable of capturing images of a landscape through the windowpane is disclosed.

SUMMARY

With respect to image capturing devices for recording a surrounding environment, prompt start-up of a device and prompt start of recording of images have been requested. However, since the electronic camera described in Patent Literature 1 starts image-capture only after the user performs a shutter operation after attaching the electronic camera on a windowpane, there has been a problem in that recording of images captured by the electronic camera cannot be started promptly.

An image capturing device according to one embodiment includes a camera unit configured to capture images of a surrounding environment and generate image data, a suction-attachment unit configured to support the camera unit and be fixed on a suction-attachment subject surface by a user, a determination unit configured to determine whether or not the image data can be output to a recording unit, and a controller configured to control output of the image data to the recording unit, based on a determination result by the determination unit.

An image capturing method according to the one embodiment includes a step of, after a camera unit is fixed on a suction-attachment subject surface, capturing images of a surrounding environment with the camera unit and generating image data, a step of determining whether or not the image data can be output to a recording unit, and a step of controlling output of the image data to the recording unit, based on a determination result.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
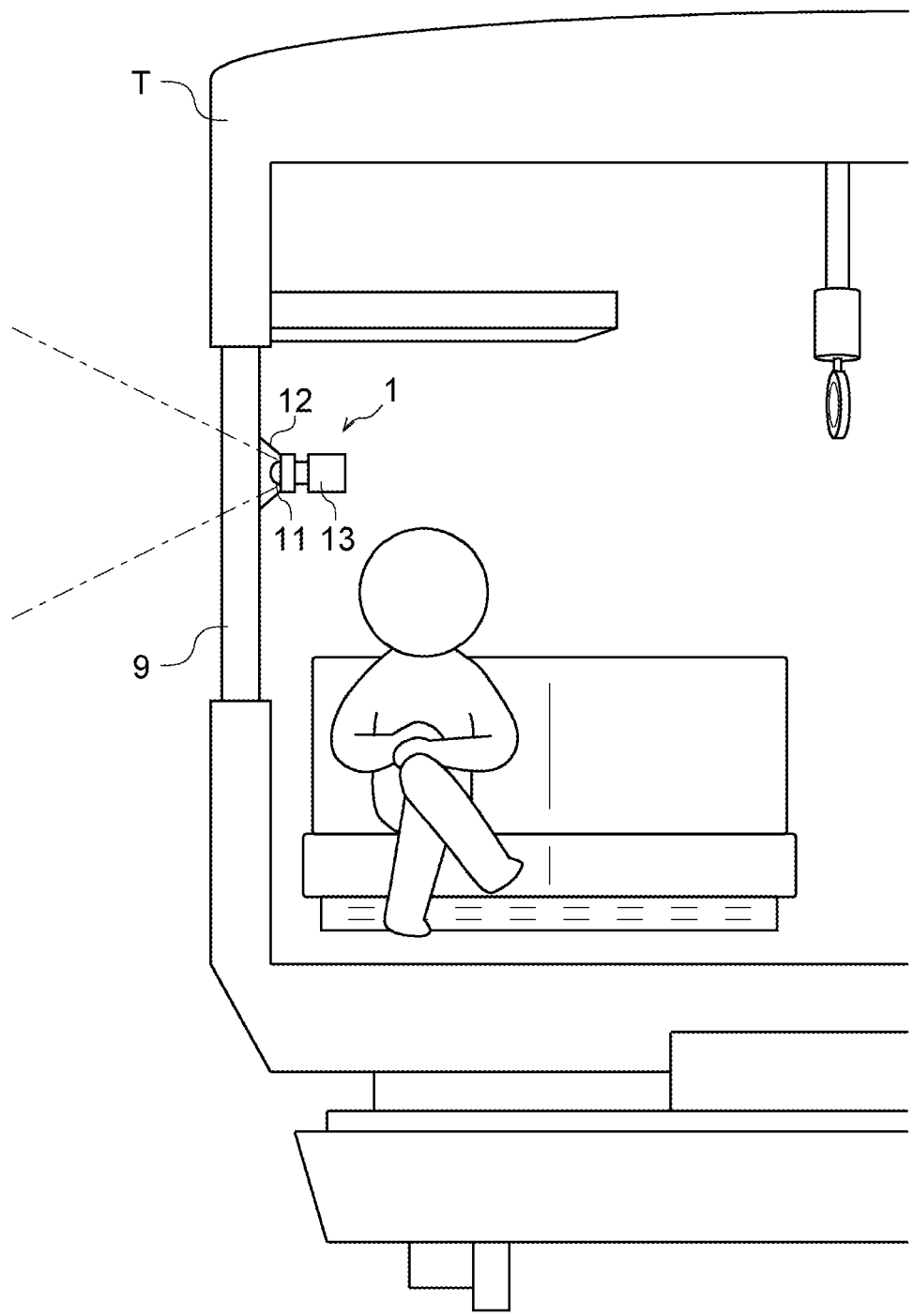
FIG. 1 is a schematic view illustrating a situation in which an image capturing device according to a first embodiment is installed in a train.

Hereinafter, specific embodiments will be described in detail with reference to the drawings. In the respective drawings, the same or corresponding components will be denoted by the same reference numerals, and, for convenience of description, overlapping descriptions thereof will be omitted as needed.

First Embodiment

Figure 2:
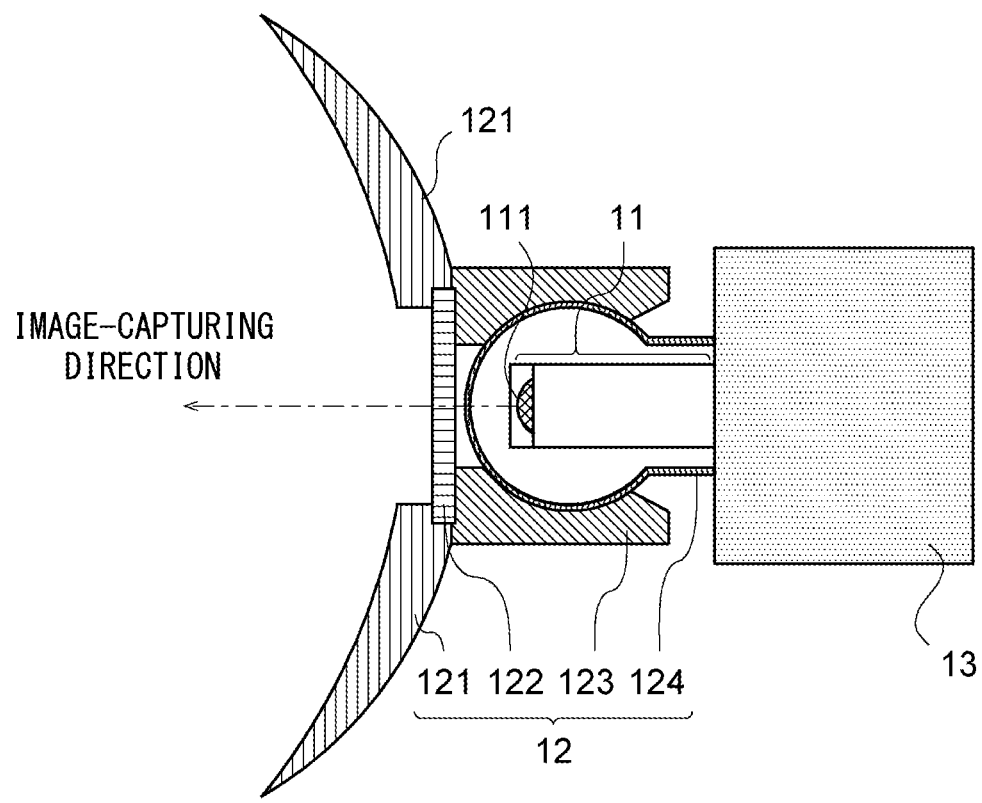
FIG. 2 is a schematic cross-sectional view illustrating a configuration of the image capturing device according to the first embodiment.

FIGS. 1 and 2 are a schematic view illustrating a situation in which an image capturing device 1 according to a first embodiment is installed in a train T and a schematic cross-sectional view illustrating a detailed configuration of the image capturing device 1, respectively. The image capturing device 1 according to the present embodiment is a device configured to be suction-attached on a windowpane of a vehicle or a windowpane of a house and capture images of a surrounding environment through the windowpane on which the image capturing device 1 is suction-attached. In the example in FIG. 1, using a windowpane of the train T as a suction-attachment subject surface 9, the image capturing device 1 is suction-attached on the suction-attachment subject surface 9.

As illustrated in FIGS. 1 and 2, the image capturing device 1 includes a camera unit 11, a suction-attachment unit 12, and a control unit 13. The camera unit 11 captures an image of a surrounding environment outside the train T through the suction-attachment subject surface 9 and generates image data. Note that the field of view of the camera unit 11 has, for example, an angular spread with an included angle of approximately 130 degrees as illustrated by the alternate long and short dash lines. The suction-attachment unit 12 supports the camera unit 11 and is fixed by a user. The suction-attachment unit 12 is fixed on the suction-attachment subject surface 9 by being pressed in the suction-attaching direction from the outside. The control unit 13 starts output of image data to a recording unit when a load applied to the image capturing device 1 from the outside satisfies a predetermined start condition. Such a configuration enables image capturing and recording by the image capturing device 1 to be started from a point of time at which the image capturing device 1 is suction-attached on the suction-attachment subject surface 9. Therefore, it is possible to capture images of and record a surrounding environment promptly.

As illustrated in FIG. 2, the camera unit 11 includes a lens 111 and is joined to the control unit 13. The suction-attachment unit 12 includes a suction cup 121, a transparent plate 122, a support portion 123, and a housing portion 124. Note that the alternate long and short dash line indicates an image capturing direction in which the camera unit 11 can capture an image. Note also that the camera unit 11 and the control unit 13, although formed in one body in FIG. 2, may be separate entities.

The housing portion 124 is a container-shaped member that has a hollow space in the interior thereof. The front end of the housing portion 124 is formed into a spherical shape. At the time of use, the camera unit 11 is housed inside the housing portion 124. The lens 111 of the camera unit 11 is arranged on the front end side inside the housing portion 124.

The support portion 123 is a cylindrically shaped member that has a through-hole in the axial direction, and, on a portion of the through-hole, the same spherical space as the front end of the housing portion 124 is formed. The housing portion 124 being housed in the spherical space formed on the support portion 123 causes the support portion 123 and the housing portion 124 to be fitted to each other in a freely rotatable manner.

The suction cup 121 is a suction cup that is formed of flexible resin material or the like in one body into a dome shape or a skirt shape. An outer periphery of the suction cup 121 suction-attaches on the suction-attachment subject surface 9 by being pressed onto the suction-attachment subject surface 9. In addition, an opening portion is formed on a portion on the projection side of the suction cup 121, and the transparent plate 122 is fitted into the opening portion. The portion on the projection side of the suction cup 121 and the transparent plate 122 are joined to the support portion 123.

Of the suction-attachment unit 12, the transparent plate 122 and at least a portion on the image capturing direction side of the housing portion 124 are formed of a transparent material, such as acrylic and glass. In addition, at least a portion on the image capturing direction side of the support portion 123 is opened. Therefore, the suction-attachment unit 12 supports the camera unit 11 without blocking the optical path of the camera unit 11. Note that the suction cup 121 and the support portion 123 preferably have light shielding property of cutting off light from the surroundings. The suction cup 121 and the support portion 123 having light shielding property enables light from directions other than the image capturing direction to be prevented from filtering in and the image quality of the camera unit 11 to be improved.

Figure 3:
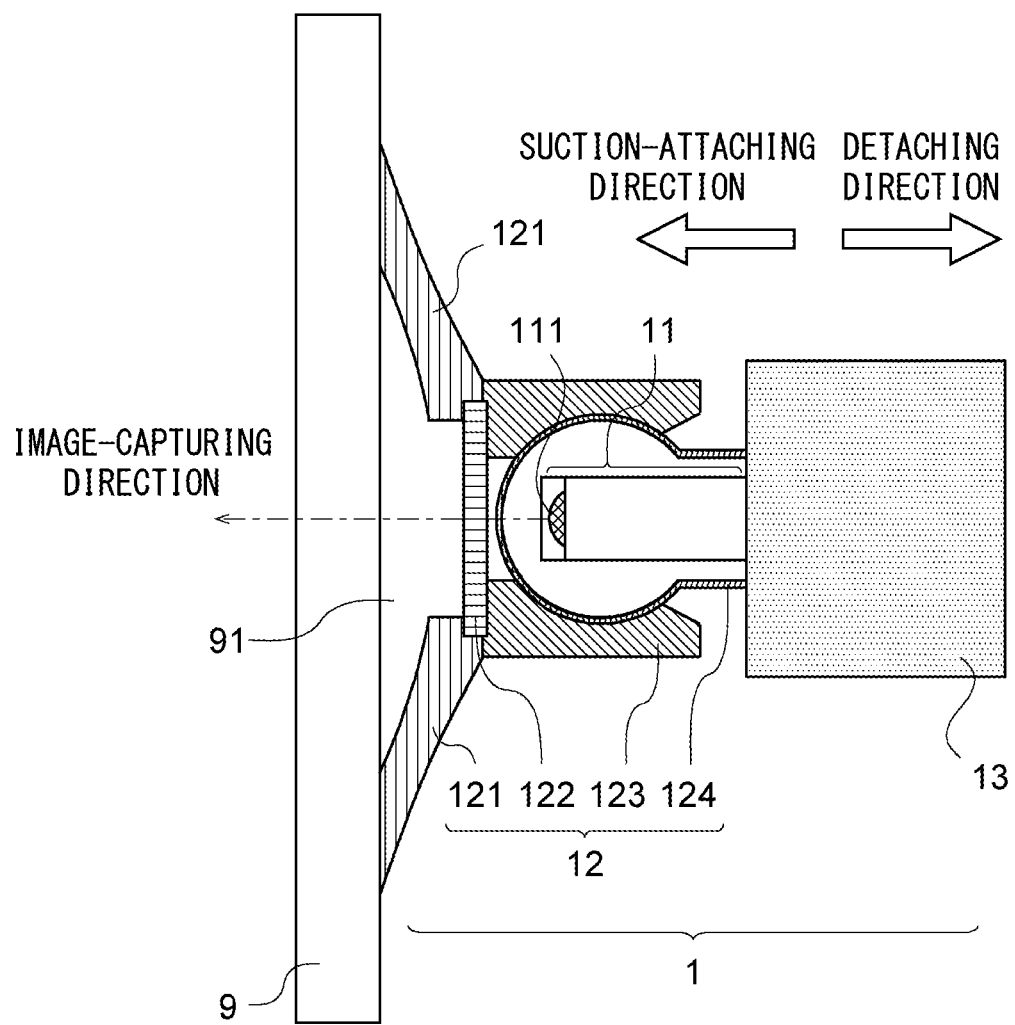
FIG. 3 is a schematic cross-sectional view illustrating the image capturing device suction-attached on a suction-attachment subject surface.

FIG. 3 is a schematic cross-sectional view illustrating the image capturing device 1 fixed on the suction-attachment subject surface 9. As illustrated in FIG. 3, the suction-attachment unit 12, by being pressed in the suction-attaching direction from the outside, has a decompressed sealed space 91 formed between the suction-attachment unit 12 and the suction-attachment subject surface 9 and is thereby fixed on the suction-attachment subject surface 9. The sealed space 91 is a space that is surrounded and sealed by the suction cup 121, the transparent plate 122, and the suction-attachment subject surface 9. In addition, the suction-attaching direction is a direction that is, as illustrated by the left direction arrow in FIG. 3, directed from the suction-attachment unit 12 toward the suction-attachment subject surface 9.

The suction-attachment unit 12 being pulled in the detaching direction from the outside causes the suction cup 121 and the suction-attachment subject surface 9 to be pulled away from each other and the suction-attachment unit 12 to be detached from the suction-attachment subject surface 9. The detaching direction is a direction that is, as illustrated by the right direction arrow in FIG. 3, directed from the suction-attachment subject surface 9 toward the suction-attachment unit 12.

Figure 4:
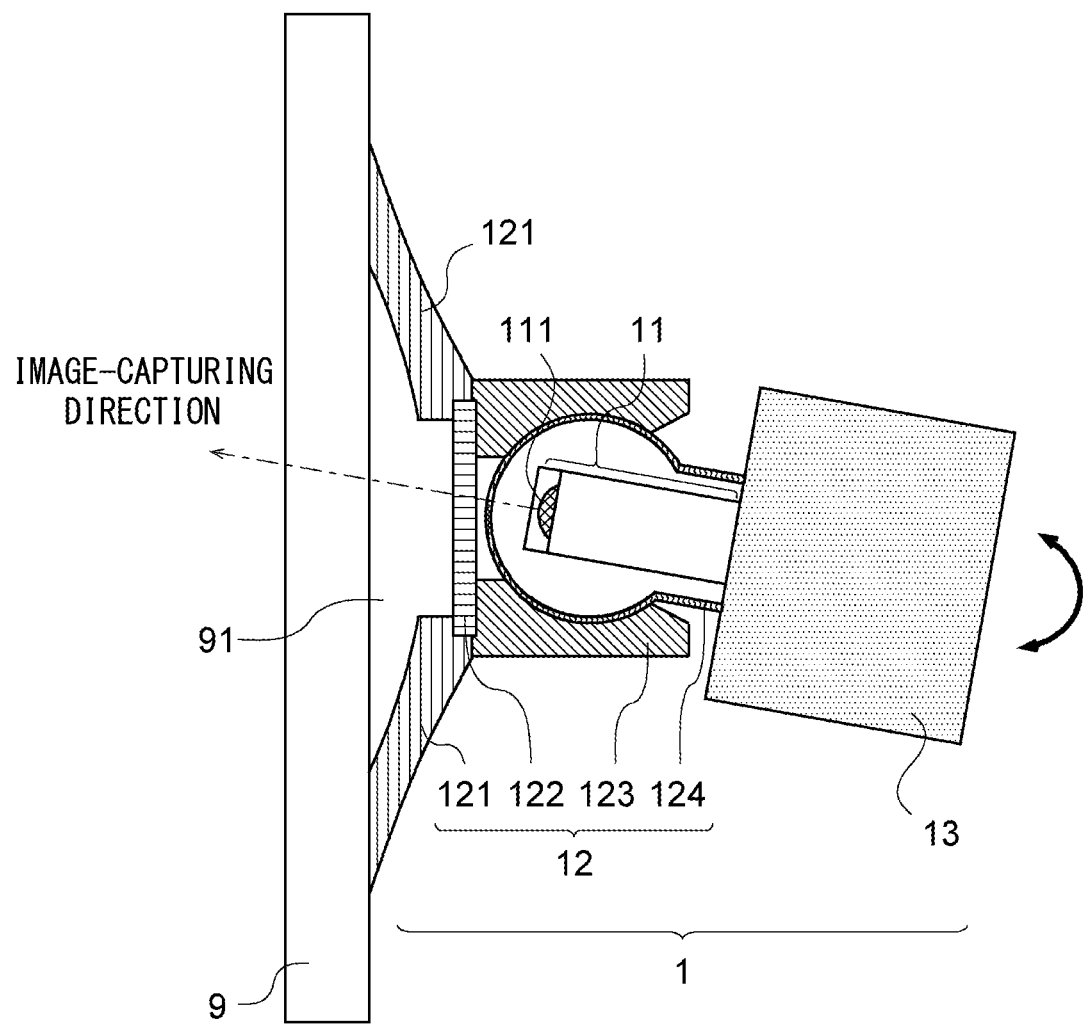
FIG. 4 is a schematic cross-sectional view illustrating the image capturing device tilted from a state in FIG. 3.

FIG. 4 is a schematic cross-sectional view illustrating the image capturing device 1 fixed on the suction-attachment subject surface 9 when the camera unit 11 is tilted. As illustrated in FIG. 4, rotating the housing portion 124 along the inner wall of the support portion 123 enables the image capturing direction of the camera unit 11 to be rotated. When the inner wall of the support portion 123 and the front end of the housing portion 124 are formed into spherical shapes, the camera unit 11 can be rotated in the vertical direction and the horizontal direction.

Note that, although, in the examples in FIGS. 2 to 4, the description was made assuming that the suction-attachment unit 12 includes the transparent plate 122, the suction-attachment unit 12 does not have to include the transparent plate 122. In this case, a space surrounded and sealed by the suction cup 121, the support portion 123, the housing portion 124, and the suction-attachment subject surface 9 being decompressed causes the suction-attachment unit 12 to be suction-attached on the suction-attachment subject surface 9. In addition, in this case, applying lubricant, such as grease, between the support portion 123 and the housing portion 124 enables the housing portion 124 to be rotated without impairing the airtightness of the sealed space.

In addition, although, in the examples in FIGS. 2 to 4, the description was made assuming that the suction-attachment unit 12 includes the suction cup 121, another type of member can be used in place of the suction cup 121 as long as the member can be fixed on the suction-attachment subject surface 9 by being pressed in the suction-attaching direction from the outside. For example, in place of the suction cup 121, rubber tape or adhesive tape having adhesion can be used.

Figure 5:
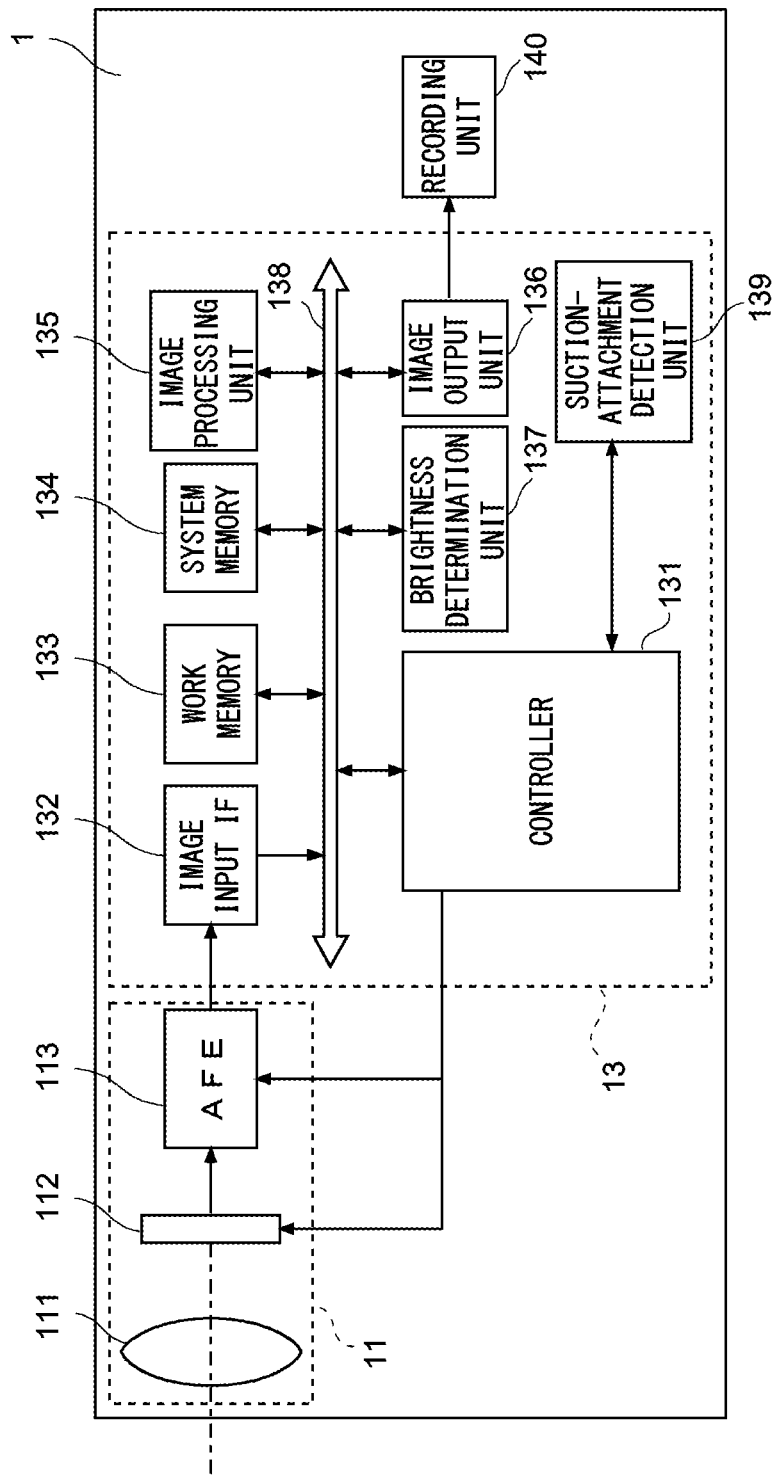
FIG. 5 is a block diagram illustrating a configuration of the image capturing device according to the first embodiment.

Next, a control system of the image capturing device 1 will be described. FIG. 5 is a block diagram illustrating a system configuration of the image capturing device 1. As illustrated in FIG. 5, the control system of the image capturing device 1 is mainly constituted by the camera unit 11 and the control unit 13. In addition, the image capturing device 1 according to the present embodiment further includes a recording unit 140 in addition to the camera unit 11 and the control unit 13.

The camera unit 11 mainly includes the lens 111, an imaging element 112, and an analog front end (AFE) 113. The control unit 13 mainly includes a controller 131, an image input interface (IF) 132, a work memory 133, a system memory 134, an image processing unit 135, an image output unit 136, a brightness determination unit 137, a bus line 138, and a suction-attachment detection unit 139.

The suction-attachment detection unit 139 is an element configured to detect a load in the suction-attaching direction applied from the outside. The suction-attachment detection unit 139 is, for example, a load sensor of a piezoelectric type or a strain gauge type and is placed at a location, such as a joining portion between the camera unit 11 and the control unit 13, that expands and contracts in response to a load from the outside. In this case, the suction-attachment detection unit 139 is capable of detecting a compression load applied from the outside as a load in the suction-attaching direction. Note that the suction-attachment detection unit 139 may further include a tilt sensor or a gyro sensor configured to detect a direction of the load sensor and acquire an angle between the direction of the load sensor and the suction-attaching direction. In this case, the suction-attachment detection unit 139 detects a length of a compression load vector that is projected onto the suction-attaching direction as a load in the suction-attaching direction. In such a configuration, even when the camera unit 11 and the control unit 13 are tilted, it is possible to detect a load in the suction-attaching direction accurately.

When a load in the suction-attaching direction is applied from the outside, the suction-attachment detection unit 139 outputs a voltage signal corresponding to the load in the suction-attaching direction to the controller 131. Specifically, the suction-attachment detection unit 139, when detecting a detectable load, outputs a voltage signal having a voltage value proportional to the magnitude of the detected load to the controller 131. While detecting a load, the suction-attachment detection unit 139 continuously outputs a voltage signal. The controller 131 is capable of, by converting a voltage signal from the suction-attachment detection unit 139 into a voltage value, obtaining the magnitude of a load applied in the suction-attaching direction from the outside. In addition, the controller 131 is capable of obtaining application duration of a load applied in the suction-attaching direction from the outside from a period of time during which a voltage signal is continuously output. The application duration of a load is length of a period of time during which the suction-attachment detection unit 139 has continuously detected the load.

In the present embodiment, the suction-attachment detection unit 139 further detects a load in the detaching direction applied from the outside. The suction-attachment detection unit 139 is, for example, a load sensor of a piezoelectric type or a strain gauge type and is placed at a location, such as a joining portion between the camera unit 11 and the control unit 13, that expands and contracts in response to a load from the outside. In this case, the suction-attachment detection unit 139 is capable of detecting a tensile load applied from the outside as a load in the detaching direction. Note that the suction-attachment detection unit 139 may further include a tilt sensor or a gyro sensor configured to detect a direction of the load sensor and acquire an angle between the direction of the load sensor and the detaching direction. In this case, the suction-attachment detection unit 139 detects a length of a tensile load vector that is projected onto the detaching direction as a load in the detaching direction. In such a configuration, even when the camera unit 11 and the control unit 13 are tilted, it is possible to detect a load in the detaching direction accurately.

When a load in the detaching direction is applied from the outside, the suction-attachment detection unit 139 outputs a voltage signal corresponding to the load in the detaching direction to the controller 131. Specifically, the suction-attachment detection unit 139, when detecting a detectable load, outputs a voltage signal having a voltage value proportional to the magnitude of the detected load to the controller 131. While detecting a load, the suction-attachment detection unit 139 continuously outputs a voltage signal. The controller 131 is capable of, by converting a voltage signal from the suction-attachment detection unit 139 into a voltage value, obtaining the magnitude of a load applied in the detaching direction from the outside. In addition, the controller 131 is capable of obtaining application duration of a load applied in the detaching direction from the outside from a period of time during which a voltage signal is continuously output.

The controller 131 is, for example, a CPU and controls respective components constituting the camera unit 11 and the control unit 13 directly or indirectly. For example, the controller 131 determines whether or not the magnitude and application duration of a load applied in the suction-attaching direction from the outside satisfy a predetermined start condition. When determining that the start condition is satisfied, the controller 131 controls the camera unit 11 to start generation of image data.

The lens 111 of the camera unit 11 is an optical element configured to guide incident subject luminous flux to the imaging element 112. The lens 111 may be constituted by a group of a plurality of optical lenses. The imaging element 112 is, for example, a CMOS image sensor. The imaging element 112 adjusts charge accumulation time by means of an electronic shutter in accordance with an exposure time per frame specified by the controller 131, performs photoelectric conversion, and outputs pixel signals. The imaging element 112 hands over the pixel signals to the AFE 113. The AFE 113 performs level adjustment on the pixel signals according to amplification gain instructed by the controller 131, analog/digital (A/D) converts the adjusted pixel signals into digital data, and transmits the digital data to the control unit 13 as image data. Note that the camera unit 11 may include a mechanical shutter and an iris diaphragm. When the camera unit 11 includes a mechanical shutter and an iris diaphragm, the controller 131 can, by use thereof, adjust the amount of light incident on the imaging element 112.

The image input IF 132 bears the function of an image data acquisition unit configured to successively acquire image data captured by the camera unit 11, that is, acquires image data from the camera unit 11 connected to the control unit 13 and hands over the acquired image data to the bus line 138.

The work memory 133 is constituted by, for example, a volatile high speed memory. The work memory 133 accepts image data from the AFE 113 via the image input IF 132 and stores the accepted image data as one frame of image data. The work memory 133 hands over image data to the image processing unit 135 in units of frame. In addition, the work memory 133 is also appropriately used as a temporary storage area when the image processing unit 135 is in the process of performing image processing.

The image processing unit 135 performs various types of image processing on image data accepted from the work memory 133 and generates frame images conforming to a predetermined format. For example, when video image data in the MPEG file format are generated, white balance processing, gamma processing, and the like are performed on respective frames of image data and, subsequently, compression processing within each frame of image data and compression processing among adjacent frames of image data are performed. The image processing unit 135 successively generates frame images on which the respective processing is performed and hands over the generated frame images to the bus line 138.

The image output unit 136, when instructed by the controller 131, outputs image data accepted from the work memory 133 to the recording unit 140. Alternatively, the image output unit 136 may convert frame images accepted from the image processing unit 135 into image data again and output the image data to the recording unit 140.

The recording unit 140 is a device capable of recording output image data, and a nonvolatile memory, such as a flash memory, can be used as the recording unit 140. Note that, although, in FIG. 5, an example in which the recording unit 140 is included in the image capturing device 1 is illustrated, the recording unit 140 may be included in a terminal external to the image capturing device 1. In this case, the image output unit 136 outputs image data to the external recording unit 140 by means of wireless or wired communication via, for example, a communication IF (not illustrated) included in the control unit 13.

The brightness determination unit 137 (also referred to as a "determination unit") determines brightness of frame images accepted from the image processing unit 135. For example, the brightness determination unit 137 extracts a value of the luminance signal Y from YCbCr information of each pixel included in a frame image and calculates an average value of the luminance values of the respective pixels as brightness of the frame image. The brightness determination unit 137 outputs calculated brightness of frame images to the controller 131. Note that the brightness determination unit 137 may arbitrarily extract some pixels included in a frame image and calculate an average value of luminance values of the pixels as brightness of the frame image. In addition, the brightness determination unit 137 may acquire RGB information of each pixel in place of YCbCr information and, using a generally known conversion formula, convert the RGB information into luminance information. On this occasion, the brightness determination unit 137 may approximately calculate a luminance value of each pixel by converting only the G value of the RGB information. In addition, the brightness determination unit 137 may convert YCbCr information of each pixel included in a frame image into luminosity information and calculate an average value of luminosity values of the respective pixels as brightness of the frame image. Further, the brightness determination unit 137 may extract a value of the luminance signal Y from YCbCr information of each pixel included in image data accepted from the work memory 133 and calculate brightness of frame images.

The system memory 134 is constituted by a nonvolatile recording medium, such as a solid-state drive (SSD). The system memory 134 records and retains constants, variables, set values, control programs, and the like that are necessary at the time of operation of the image capturing device 1. Control performed by the controller 131 is achieved by control programs and the like read from the system memory 134.

Figure 6:
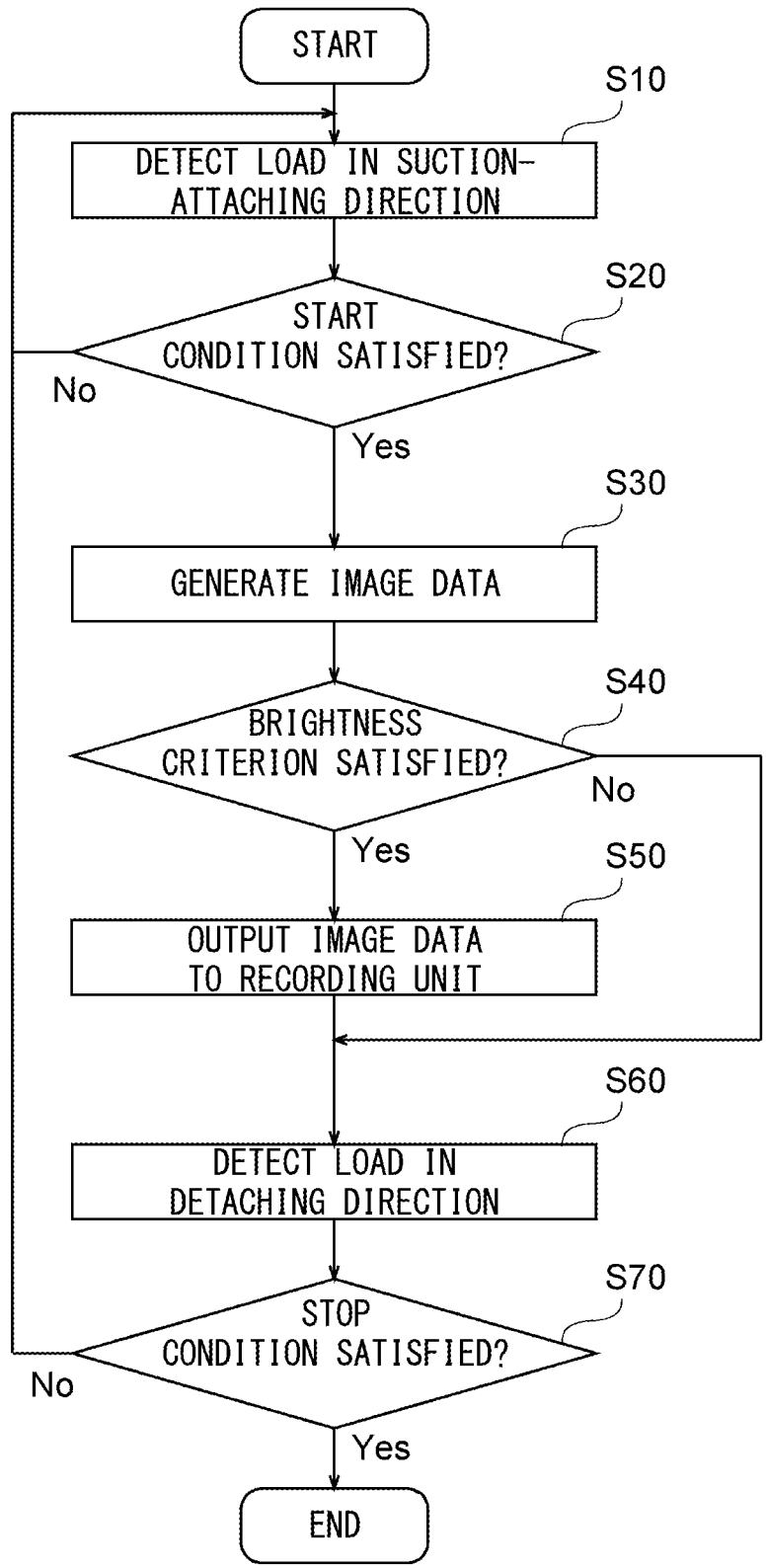
FIG. 6 is a flow diagram illustrating a control flow of the image capturing device according to the first embodiment.

Next, a control flow of the image capturing device 1 will be described. FIG. 6 is a flow diagram illustrating the control flow of the image capturing device 1. The flow is started at a point of time at which the control unit 13 becomes ready to operate. The point of time at which the control unit 13 becomes ready to operate is, for example, a point of time at which the user turns on the power supply of the image capturing device 1.

First, in step S10, the suction-attachment detection unit 139 detects a load in the suction-attaching direction applied from the outside. The suction-attachment detection unit 139 outputs a voltage signal corresponding to the magnitude of the load in the suction-attaching direction applied from the outside to the controller 131. When unable to detect a load in the suction-attaching direction applied from the outside, the suction-attachment detection unit 139 does not have to output a voltage signal to the controller 131. The controller 131 converts an accepted voltage signal into information on a voltage value and application duration and thereby acquires information on the magnitude of the load in the suction-attaching direction applied from the outside and application duration of the load. Subsequently, the flow proceeds to step S20, When the flow proceeds to step S20, the controller 131 determines whether or not a relationship between the magnitude and application duration of the load in the suction-attaching direction detected by the suction-attachment detection unit 139 satisfies a predetermined start condition. The start condition is a condition that is satisfied when a load required for the suction-attachment unit 12 to suction-attach on the suction-attachment subject surface 9 is applied from the outside.

For example, it can be defined that, when a load the magnitude of which is equal to or greater than a preset suction-attaching load value (for example, 10 G) is applied in the suction-attaching direction for a preset suction-attaching duration (for example, 1 second), the start condition is satisfied. Alternatively, it can be defined that, when a load is applied in the suction-attaching direction in such a way that the product of the magnitude of the load and application duration of the load becomes equal to or greater than a preset suction-attaching impulse value (for example, 100 N□s), the start condition is satisfied. In the examples described above, specific numerical values of the suction-attaching load value, the suction-attaching duration, and the suction-attaching impulse value are determined depending on the structure, physical properties, and the like of the suction-attachment unit 12. For example, the numerical values can be determined through physical simulation or preliminary experiment.

When a relationship between the magnitude and application duration of the load in the suction-attaching direction satisfies the above-described start condition (Yes in step S20), the flow proceeds to step S30 and generation and the like of image data are started. On the other hand, when the relationship between the magnitude and application duration of the load in the suction-attaching direction does not satisfy the above-described start condition (No in step S20), the flow returns to step S10 and the step is repeated. In such a configuration, since no sooner does the image capturing device 1 suction-attach on the suction-attachment subject surface 9 than the generation and the like of image data are started, it is possible to start output of image data promptly.

When the flow proceeds to step S30, the controller 131 makes the camera unit 11 operate and capture images of the surrounding environment and generate image data. In addition, the controller 131 makes the image processing unit 135 perform various types of image processing on the generated image data and generate frame images. Subsequently, the flow proceeds to step S40.

When the flow proceeds to step S40, the controller 131 determines whether or not the brightness of frame images that the brightness determination unit 137 determined satisfies a predetermined brightness criterion. The brightness criterion is a criterion that is satisfied when the camera unit 11 receives light from the surrounding environment. In other words, the brightness criterion is not satisfied when the camera unit 11 does not receive light from the surrounding environment and thus cannot generate normal image data.

For example, when an average of luminance values of pixels included in a frame image is equal to or greater than a preset luminance criterion value (for example, 10), it is determined that the predetermined brightness criterion is satisfied. In the example, a specific numerical value of the luminance criterion value is determined depending on image-capturing precision and the like of the camera unit 11. For example, a luminance value of a frame image when darkness is captured can be determined as the luminance criterion value.

When the brightness of the frame images satisfies the above-described brightness criterion (Yes in step S40), the flow proceeds to step S50. On the other hand, when the brightness of the frame images does not satisfy the above-described brightness criterion (No in step S40), the flow is terminated without outputting image data to the recording unit 140. In such a configuration, when no normal image data can be generated because the optical path of the camera unit 11 is cut off, such as when the image capturing device 1 is mistakenly suction-attached to a non-transparent object, it is possible to prevent output of image data from being started.

When the flow proceeds to step S50, the controller 131 controls the image output unit 136 to start output of image data to the recording unit 140. Starting output of image data includes outputting image data to the outside of the image capturing device 1 by means of wireless or wired communication via a communication IF (not illustrated). Subsequently, the flow proceeds to step S60.

When the flow proceeds to step S60, the suction-attachment detection unit 139 detects a load in the detaching direction applied from the outside. The suction-attachment detection unit 139 outputs a voltage signal corresponding to the magnitude of the load in the detaching direction applied from the outside to the controller 131. When unable to detect a load in the detaching direction applied from the outside, the suction-attachment detection unit 139 does not have to output a voltage signal to the controller 131. The controller 131 converts the accepted voltage signal into information on a voltage value and application duration and thereby acquires information on the magnitude of the load in the detaching direction applied from the outside and application duration of the load. Subsequently, the flow proceeds to step S70.

When the flow proceeds to step S70, the controller 131 determines whether or not a relationship between the magnitude and application duration of the load in the detaching direction detected by the suction-attachment detection unit 139 satisfies a predetermined stop condition. The stop condition is a condition that is satisfied when a load required for the suction-attachment unit 12 to be detached from the suction-attachment subject surface 9 is applied from the outside.

For example, it can be defined that, when a load the magnitude of which is equal to or greater than a preset detaching load value (for example, 10 G) is applied in the detaching direction for a preset detaching duration (for example, 1 second), the stop condition is satisfied. Alternatively, it can be defined that, when a load is applied in the detaching direction in such a way that the product of the magnitude and application duration of the load becomes equal to or greater than a preset detaching impulse value (for example, 100 N☐s), the stop condition is satisfied. In the examples described above, specific numerical values of the detaching load value, the detaching duration, and the detaching impulse value are determined with the structure, physical properties, and the like of the suction-attachment unit 12 taken into consideration. For example, the numerical values can be determined through physical simulation or preliminary experiment.

When a relationship between the magnitude of the load in the detaching direction and application duration of the load satisfies the above-described stop condition (Yes in step S70), output of image data to the recording unit 140 is stopped and the flow is terminated. On the other hand, when the relationship between the magnitude and application duration of the load in the detaching direction does not satisfy the above-described stop condition (No in step S70), the flow returns to step S10 and the step and subsequent steps are repeated. In such a configuration, since no sooner is the image capturing device 1 detached from the suction-attachment subject surface 9 than the generation and the like of image data are stopped, it is possible to stop output of image data promptly.

By repeating steps S10 to S70, which have been described thus far, the image capturing device 1 is capable of recording the surrounding environment promptly. It should be noted that the present disclosure is not limited to the above-described embodiment and can be appropriately modified as long as the modification does not deviate from the scope of the present embodiment.

For example, although, in the above-described embodiment, in order to describe an image capturing device according to the present disclosure, the description was made using as an example a device configured to capture an image of a surrounding environment on the outside through a suction-attachment subject surface, the image capturing device according to the present disclosure is not limited to the above-described example. That is, the image capturing device according to the present disclosure may be a device configured to capture images of a surrounding environment in the opposite direction to the suction-attaching direction or the vertical direction. In such a device, having a configuration equivalent to those of the camera unit 11 and the control unit 13 described above and repeating processing in steps S10 to S70 enable the image capturing device to record a surrounding environment promptly.

In addition, in the above-described embodiment, a portion of processing in steps S10 to S70 may be appropriately omitted or the order of execution of the processing in steps S10 to S70 may be rearranged within an extent not impairing advantageous effects of the present disclosure. For example, when, after it is once determined that brightness of a frame image satisfies a brightness criterion in step S40 (Yes in step S40), the processing from step S30 onward is repeated again, the processing in step S40 in the second or later round may be appropriately omitted. Omitting the processing in step S40 in the second or later round enables the control flow to be simplified.

In addition, although, in the above-described embodiment, a case where the controller of the image capturing device makes the camera unit operate when determining that the start condition is satisfied was described, the camera unit may be configured to constantly operate. Alternatively, the camera unit may start operation by a start-up operation by the user.

Note that, in the above-described embodiment, it is preferable to include a condition requiring application duration of a load to be equal to or longer than a preset suction-attaching duration in the start condition. Such a configuration enables the image capturing device to be prevented from malfunctioning when a load in the suction-attaching direction is instantaneously applied, such as when the image capturing device hits some object.

In addition, in the above-described embodiment, it is preferable to include a condition requiring application duration of a load to be equal to or longer than a preset detaching duration in the stop condition. Such a configuration enables the image capturing device to be prevented from malfunctioning when a load in the detaching direction is instantaneously applied, such as when the image capturing device hits some object.

Second Embodiment

Figure 7:
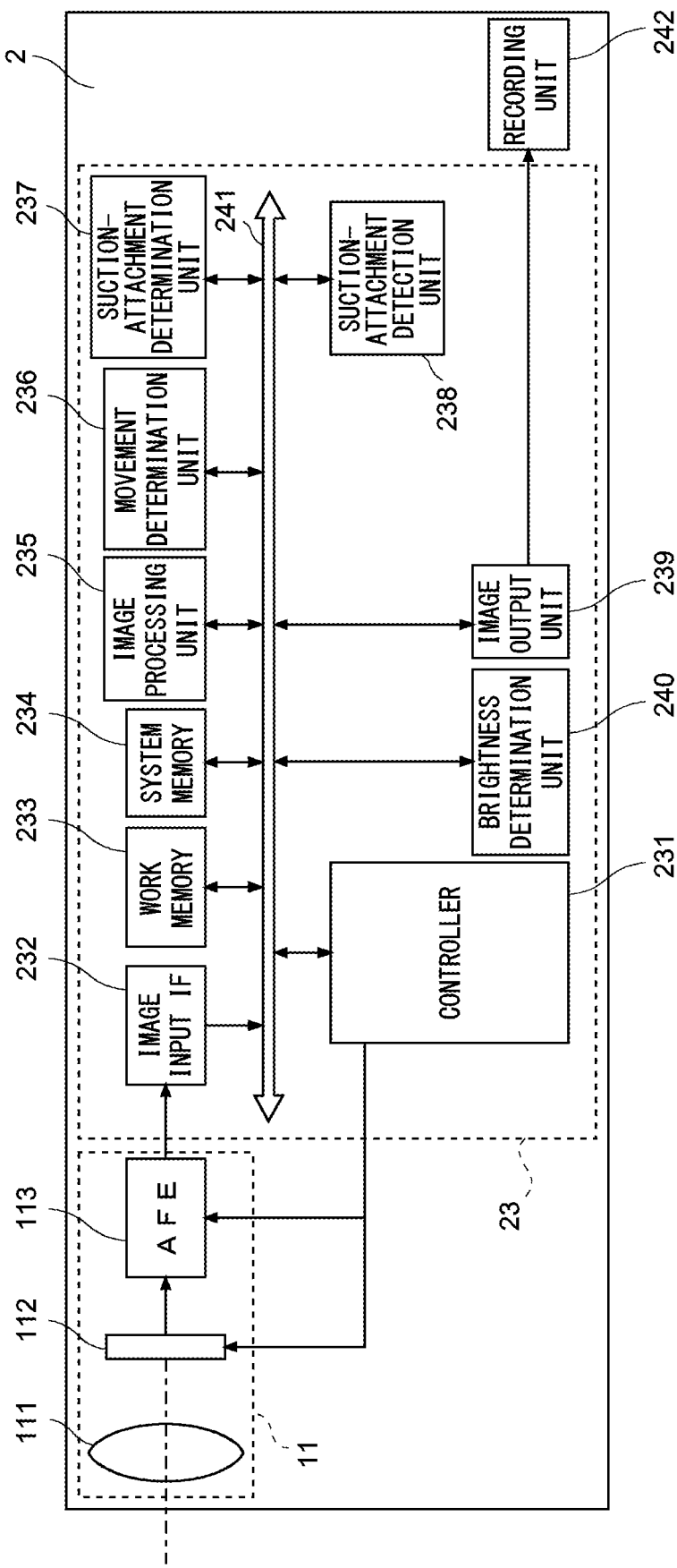
FIG. 7 is a block diagram illustrating a configuration of an image capturing device according to a second embodiment.

Next, an image capturing device according to a second embodiment will be described. FIG. 7 is a block diagram illustrating a configuration of the image capturing device according to the second embodiment. An image capturing device 2 according to the second embodiment differs from the image capturing device 1 according to the first embodiment in a configuration of a control unit 23 in the block diagram illustrated in FIG. 7. Since the configurations of the other components are similar to the device configuration described in the first embodiment (see FIGS. 1 to 4), descriptions of overlapping explanations will be omitted.

As illustrated in FIG. 7, a control system of the image capturing device 2 is mainly constituted by a camera unit 11 and the control unit 23. In addition, the image capturing device 2 according to the present embodiment further includes a recording unit 242 in addition to the camera unit 11 and the control unit 23.

The camera unit 11 mainly includes a lens 111, an imaging element 112, and an analog front end (AFE) 113. The control unit 23 mainly includes a controller 231, an image input interface (IF) 232, a work memory 233, a system memory 234, an image processing unit 235, a movement determination unit 236, a suction-attachment determination unit 237, a suction-attachment detection unit 238, an image output unit 239, a brightness determination unit 240, and a bus line 241. Note that, herein, the movement determination unit 236, the suction-attachment determination unit 237, and the brightness determination unit 240 are sometimes collectively referred to as "determination units". In addition, the movement determination unit 236, the suction-attachment determination unit 237, and the brightness determination unit 240 may be represented by one functional block ("determination unit").

The suction-attachment detection unit 238 detects a physical quantity representing a relationship between a suction-attachment unit 12 and a suction-attachment subject surface 9 (see FIGS. 1 and 3). Examples of the physical quantity representing a relationship between the suction-attachment unit 12 and the suction-attachment subject surface 9 includes the magnitude of stress applied between the suction-attachment unit 12 and the suction-attachment subject surface 9 and pressure in a space between the suction-attachment unit 12 and the suction-attachment subject surface 9 (a sealed space 91). The suction-attachment detection unit 238 outputs a voltage signal corresponding to the detected physical quantity to the bus line 241.

Note that the suction-attachment detection unit 238 may be disposed outside the control unit 23. In that case, the suction-attachment detection unit 238 outputs a voltage signal to a detection signal IF (not illustrated) disposed in the control unit 23. The detection signal IF (not illustrated) successively acquires the voltage signal from the suction-attachment detection unit 238 and hands over the acquired voltage signal to the bus line 241.

In the present embodiment, an example in which the suction-attachment detection unit 238 detects the magnitude of stress applied between the suction-attachment unit 12 and the suction-attachment subject surface 9 will be described. The stress applied between the suction-attachment unit 12 and the suction-attachment subject surface 9 is a load in the suction-attaching direction applied to the image capturing device 2 from the outside. On this occasion, the suction-attachment detection unit 238 is, for example, a load sensor of a piezoelectric type or a strain gauge type and is arranged at a location, such as a joining portion between the camera unit 11 and the control unit 23, that expands and contracts in response to a load from the outside. In this case, the suction-attachment detection unit 238 is capable of detecting a compression load applied from the outside as a load in the suction-attaching direction. Note that the suction-attachment detection unit 238 may further include a tilt sensor configured to detect a direction of the load sensor and acquire an angle between the direction of the load sensor and the suction-attaching direction. In this case, the suction-attachment detection unit 238 detects a length of a compression load vector that is projected onto the suction-attaching direction as a load in the suction-attaching direction. In such a configuration, even when the camera unit 11 and the control unit 23 are tilted, it is possible to detect a load in the suction-attaching direction accurately.

When a load in the suction-attaching direction is applied from the outside, the suction-attachment detection unit 238 outputs a voltage signal corresponding to the load in the suction-attaching direction to bus line 241. Specifically, the suction-attachment detection unit 238, when detecting a detectable load, outputs a voltage signal having a voltage value proportional to the magnitude of the detected load to the controller 231. While detecting a load, the suction-attachment detection unit 238 continuously outputs a voltage signal. The controller 231 is capable of, by converting a voltage signal from the suction-attachment detection unit 238 into a voltage value, obtaining the magnitude of a load applied in the suction-attaching direction from the outside. In addition, the controller 231 is capable of obtaining application duration of a load applied in the suction-attaching direction from the outside from a period of time during which a voltage signal is continuously output. The application duration of a load is length of a period of time during which the suction-attachment detection unit 238 has continuously detected the load.

In addition, the suction-attachment detection unit 238 may further detect a load in the detaching direction applied from the outside. In this case, the suction-attachment detection unit 238 detects a tensile load applied from the outside as a load in the detaching direction. Note that the suction-attachment detection unit 238 may further include a tilt sensor configured to detect a direction of the load sensor and acquire an angle between the direction of the load sensor and the detaching direction. In this case, the suction-attachment detection unit 238 detects a length of a tensile load vector that is projected onto the detaching direction as a load in the detaching direction. In such a configuration, even when the camera unit 11 and the control unit 23 are tilted, it is possible to detect a load in the detaching direction accurately.

On this occasion, when a load in the detaching direction is applied from the outside, the suction-attachment detection unit 238 outputs a voltage signal corresponding to the load in the detaching direction to the bus line 241. Specifically, the suction-attachment detection unit 238, when detecting a detectable load, outputs a voltage signal having a voltage value proportional to the magnitude of the detected load to the controller 231. While detecting a load, the suction-attachment detection unit 238 continuously outputs a voltage signal. The controller 231 is capable of, by converting a voltage signal from the suction-attachment detection unit 238 into a voltage value, obtaining the magnitude of a load applied in the detaching direction from the outside. In addition, the controller 231 is capable of obtaining application duration of a load applied in the detaching direction from the outside from a period of time during which a voltage signal is continuously output.

The suction-attachment determination unit 237 determines whether or not a suction-attachment condition that is satisfied when the suction-attachment unit 12 suction-attaches on the suction-attachment subject surface 9 is satisfied. For example, the suction-attachment determination unit 237 converts a voltage signal that the suction-attachment detection unit 238 has output into a physical quantity, such as the magnitude of a load in the suction-attaching direction. The suction-attachment determination unit 237 determines whether or not the magnitude of the obtained physical quantity satisfies the suction-attachment condition. The suction-attachment determination unit 237, when determining that the suction-attachment condition is satisfied, outputs a suction-attachment signal to the controller 231.

The controller 231 is, for example, a CPU and controls respective components constituting the camera unit 11 and the control unit 23 directly or indirectly. For example, when the suction-attachment determination unit 237 determines that the suction-attachment condition is satisfied, the controller 231 controls the camera unit 11 to start generation of image data. That is, the controller 231, when acquiring a suction-attachment signal from the suction-attachment determination unit 237, controls the camera unit 11 to start generation of image data.

The lens 111 of the camera unit 11 is an optical element configured to guide incident subject luminous flux to the imaging element 112. The lens 111 may be constituted by a group of a plurality of optical lenses. The imaging element 112 is, for example, a CMOS image sensor. The imaging element 112 adjusts charge accumulation time by means of an electronic shutter in accordance with an exposure time per frame specified by the controller 231, performs photoelectric conversion, and outputs pixel signals. The imaging element 112 hands over the pixel signals to the AFE 113. The AFE 113 performs level adjustment on the pixel signals according to amplification gain instructed by the controller 231, analog/digital (A/D) converts the pixel signals into digital data, and transmits the digital data to the control unit 23 as image data. Note that the camera unit 11 may include a mechanical shutter and an iris diaphragm. When the camera unit 11 includes a mechanical shutter and an iris diaphragm, the controller 231 can, by use thereof, adjust the amount of light incident on the imaging element 112.

The image input IF 232 bears the function of an image data acquisition unit configured to successively acquire image data captured by the camera unit 11, that is, acquires image data from the camera unit 11 connected to the control unit 23 and hands over the acquired image data to the bus line 241.

The work memory 233 is constituted by, for example, a volatile high speed memory. The work memory 233 accepts image data from the AFE 113 via the image input IF 232 and stores the accepted image data as one frame of image data. The work memory 233 hands over image data to the image processing unit 235 in units of frame. In addition, the work memory 233 is also appropriately used as a temporary storage area when the image processing unit 235 is in the process of performing image processing.

The image processing unit 235 performs various types of image processing on image data accepted from the work memory 233 and generates frame images conforming to a predetermined format. For example, when video image data in the MPEG file format are generated, white balance processing, gamma processing, and the like are performed on respective frames of image data and, subsequently, compression processing within each frame of image data and compression processing among adjacent frames of image data are performed. The image processing unit 235 successively generates frame images on which the respective processing is performed and hands over the generated frame images to the bus line 241.

The movement determination unit 236 determines whether or not the camera unit 11 has moved relatively to a surrounding environment. The movement determination unit 236, when determining that the camera unit 11 has moved, outputs a movement signal to the bus line 241.

For example, the movement determination unit 236 accepts successive frame images from the image processing unit 235 and calculates differences between a preceding frame image and its succeeding frame image as movement vectors of the respective pixels. Next, a set of pixels the movement vectors of which are zero is extracted as an immobile region. The immobile region is a region that is immobile relatively to the camera unit 11.

Subsequently, the movement determination unit 236 generates binary images in each of which pixels in an immobile region have a value of "0" and pixels outside the immobile region have a value of "1". The generated binary images have noise removed by a known noise removal method, such as a morphological transformation. A region represented by pixels having a value of "1" in a binary image after noise removal is estimated to correspond to a region that is moving relatively to the camera unit 11. Therefore, when the number of pixels having a value of "1" existing in a binary image after noise removal is equal to or greater than a predetermined movement criterion value (for example, 50% of the total number of pixels), the movement determination unit 236 can determine that the camera unit 11 is moving. Note that, in the example, specific numerical values of respective parameters used in the noise removal and the movement criterion value are determined depending on the resolution, precision, and the like of the camera unit 11 and can be determined through physical simulation or preliminary experiment.

The image output unit 239, when instructed by the controller 231, outputs image data accepted from the work memory 233 to the recording unit 242. On this occasion, the image output unit 239 may convert frame images accepted from the image processing unit 235 into image data again and output the image data to the recording unit 242.

The recording unit 242 is a device capable of recording output image data, and a nonvolatile memory, such as a flash memory, can be used as the recording unit 140. Note that, although, in FIG. 7, an example in which the recording unit 242 is included in the image capturing device 2 is illustrated, the recording unit 242 may be included in a terminal external to the image capturing device 2. In this case, the image output unit 239 outputs image data to the external recording unit 242 by means of wireless or wired communication via, for example, a communication IF (not illustrated) included in the control unit 23.

The brightness determination unit 240 determines brightness of frame images accepted from the image processing unit 235. For example, the brightness determination unit 240 extracts a value of the luminance signal Y from YCbCr information of each pixel included in a frame image and calculates an average value of the luminance values of the respective pixels as brightness of the frame image. The brightness determination unit 240 outputs calculated brightness of frame images to the controller 231. Note that the brightness determination unit 240 may arbitrarily extract some pixels included in a frame image and calculate an average value of luminance values of the pixels as brightness of the frame image. In addition, the brightness determination unit 240 may acquire RGB information of each pixel in place of YCbCr information and, using a generally known conversion formula, convert the RGB information into luminance information. On this occasion, the brightness determination unit 240 may approximately calculate a luminance value of each pixel by converting only the G value of the RGB information. In addition, the brightness determination unit 240 may convert YCbCr information of each pixel included in a frame image into luminosity information and calculate an average value of luminosity values of the respective pixels as brightness of the frame image. Further, the brightness determination unit 240 may extract a value of the luminance signal Y from YCbCr information of each pixel included in image data accepted from the work memory 233 and calculate brightness of a frame image.

The system memory 234 is constituted by a nonvolatile recording medium, such as a solid-state drive (SSD). The system memory 234 records and retains constants, variables, set values, control programs, and the like that are necessary at the time of operation of the image capturing device 2. Control performed by the controller 231 is achieved by control programs and the like read from the system memory 234.

Figure 8:
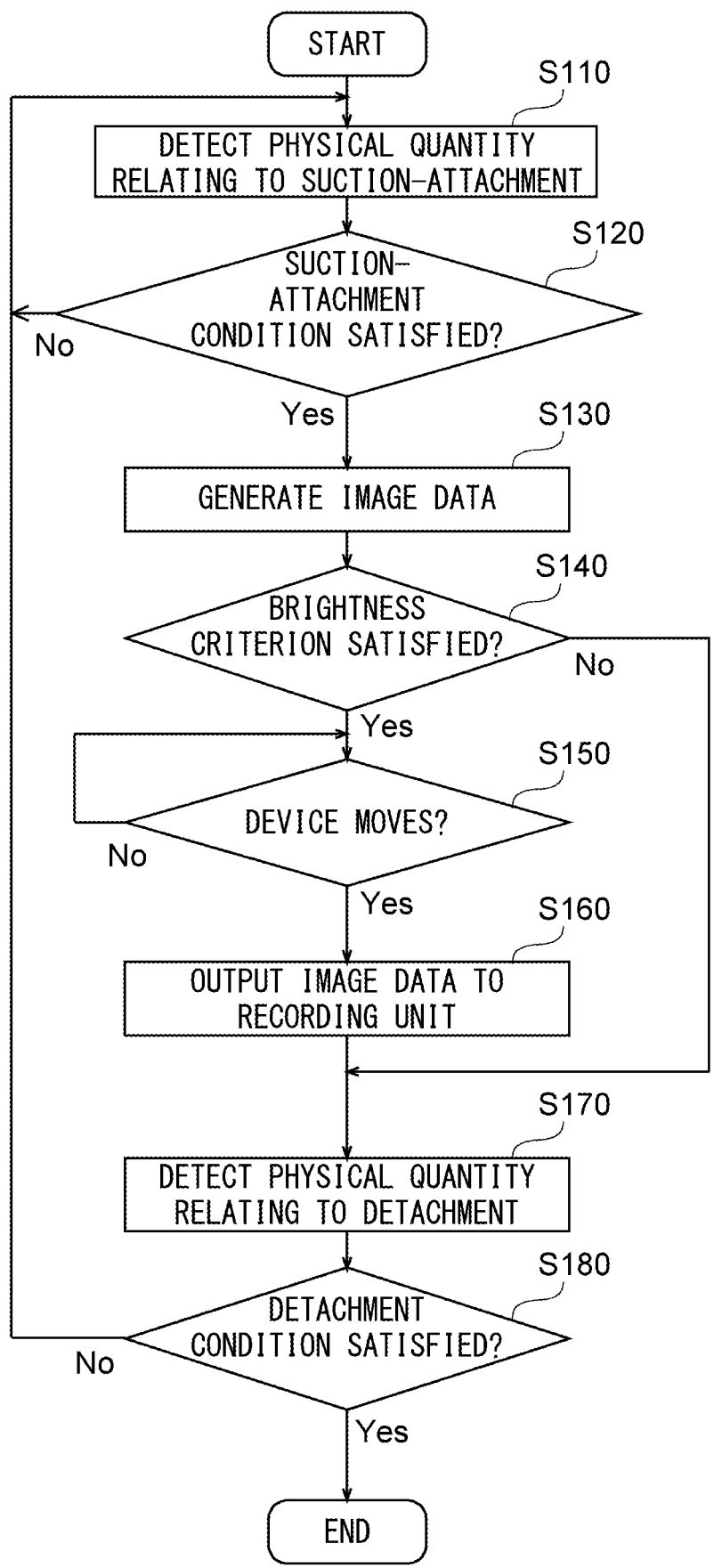
FIG. 8 is a flow diagram illustrating a control flow of the image capturing device according to the second embodiment.

Next, a control flow of the image capturing device 2 will be described. FIG. 8 is a flow diagram illustrating the control flow of the image capturing device 2. The flow is started at a point of time at which the control unit 23 becomes ready to operate. The point of time at which the control unit 23 becomes ready to operate is, for example, a point of time at which the user turns on the power supply of the image capturing device 2. In the present embodiment, an example of a case where a sensor configured to detect a load in the suction-attaching direction applied from the outside is used as the suction-attachment detection unit 238 will be described.

First, in step S110, the suction-attachment detection unit 238 detects a physical quantity representing a relationship between the suction-attachment unit 12 and the suction-attachment subject surface 9. Specifically, the suction-attachment detection unit 238 detects a load in the suction-attaching direction applied from the outside. In this case, the suction-attachment detection unit 238 outputs a voltage signal corresponding to the magnitude of the load in the suction-attaching direction applied from the outside to the bus line 241. When unable to detect a load in the suction-attaching direction applied from the outside, the suction-attachment detection unit 238 does not have to output a voltage signal to bus line 241. The suction-attachment determination unit 237 converts the voltage signal accepted from the suction-attachment detection unit 238 and thereby acquires the magnitude of the load in the suction-attaching direction applied from the outside and application duration of the load. Subsequently, the flow proceeds to step S120.

When the flow proceeds to step S120, the suction-attachment determination unit 237 determines whether or not a relationship between the suction-attachment unit 12 and the suction-attachment subject surface 9 satisfies a suction-attachment condition. The suction-attachment condition is a condition that is satisfied when the suction-attachment unit 12 suction-attaches on the suction-attachment subject surface 9. In the present embodiment, the suction-attachment determination unit 237 determines whether or not a relationship between the magnitude of the load in the suction-attaching direction detected by the suction-attachment detection unit 238 and application duration of the load satisfies a predetermined suction-attaching load condition. The suction-attaching load condition is a condition that is satisfied when a load required for the suction-attachment unit 12 to suction-attach on the suction-attachment subject surface 9 is applied from the outside. When a relationship between the magnitude of the load in the suction-attaching direction and application duration of the load satisfies the suction-attaching load condition, the suction-attachment determination unit 237 determines that the suction-attachment condition is satisfied.

For example, it can be defined that, when a load the magnitude of which is equal to or greater than a preset suction-attaching load value (for example, 10 G) is applied in the suction-attaching direction for a preset suction-attaching duration (for example, 1 second), the suction-attaching load condition is satisfied. Alternatively, it can be defined that, when a load is applied in the suction-attaching direction in such a way that the product of the magnitude of the load and application duration of the load becomes equal to or greater than a preset suction-attaching impulse value (for example, 100 N□s), the suction-attachment condition is satisfied. In the examples described above, specific numerical values of the suction-attaching load value, the suction-attaching duration, and the suction-attaching impulse value are determined depending on the structure, physical properties, and the like of the suction-attachment unit 12. For example, the numerical values can be determined through physical simulation or preliminary experiment.

When a relationship between the magnitude of the load in the suction-attaching direction and application duration of the load satisfies the above-described suction-attachment condition (Yes in step S120), the suction-attachment determination unit 237 outputs a suction-attachment signal to the bus line 241 and the flow proceeds to step S130. On the other hand, when the relationship between the magnitude of the load in the suction-attaching direction and application duration of the load does not satisfy the above-described suction-attachment condition (No in step S120), the flow returns to step S110.

When the flow proceeds to step S130, that is, when the controller 231 acquires the suction-attachment signal, the controller 231 initiates generation and the like of image data. Specifically, the controller 231 makes the camera unit 11 operate and capture images of the surrounding environment and generate image data. In addition, the controller 231 makes the image processing unit 235 perform various types if image processing on the generated image data and generate a plurality of frame images. Subsequently, the flow proceeds to step S140.

When the flow proceeds to step S140, the controller 231 acquires brightness of the frame images that the brightness determination unit 240 has determined. The controller 231 determines whether or not the brightness of the frame images satisfies a predetermined brightness criterion. The brightness criterion is a criterion that is satisfied when the camera unit 11 receives light from the surrounding environment. In other words, the brightness criterion is not satisfied when the camera unit 11 does not receive light from the surrounding environment and thus cannot generate normal image data.

For example, when an average of luminance values of pixels included in a frame image is equal to or greater than a preset luminance criterion value (for example, 10), it is determined that the predetermined brightness criterion is satisfied. In the example, a specific numerical value of the luminance criterion value is determined depending on image-capturing precision and the like of the camera unit 11. For example, a luminance value of a frame image when darkness is captured can be determined as the luminance criterion value.

When the brightness of the frame images satisfies the above-described brightness criterion (Yes in step S140), the flow proceeds to step S150. On the other hand, when the brightness of the frame images does not satisfy the above-described brightness criterion (No in step S140), the flow proceeds to step S170 without outputting image data to the recording unit 242. Note that, when, after output of image data to the recording unit 242 is performed in step S160, which will be described later, the flow returns to step S140, the flow proceeds to step S170 after the controller 231 stops output of image data to the recording unit 242. In such a configuration, when no normal image data can be generated because the optical path of the camera unit 11 is cut off, such as when the image capturing device 2 is mistakenly suction-attached to a non-transparent object, it is possible to prevent output of image data from being started.

When the flow proceeds to step S150, the movement determination unit 236 determines whether or not the camera unit 11 has moved relatively to the surrounding environment. When the movement determination unit 236 determines that the camera unit 11 has moved (Yes in step S150), the movement determination unit 236 outputs a movement signal to the bus line 241 and the flow proceeds to step S160. In step S160 onward, output of image data to the recording unit 242 is started. In such a configuration, no sooner is the image capturing device 2 suction-attached on the suction-attachment subject surface 9 and does the camera unit 11 move than recording of image data can be started.

On the other hand, when the movement determination unit 236 determines that the camera unit 11 has not moved (No in step S150), the flow returns to step S150 and the processing in the step is repeated. Note that, when, after output of image data to the recording unit 242 is performed in step S160, which will be described later, the flow returns to step S150, the flow returns to step S150 after the controller 231 stops output of image data to the recording unit 242 and the processing in the step is repeated. In such a configuration, no sooner is the movement of camera unit 11 stopped than the recording of image data can be stopped.

When the flow proceeds to step S160, the controller 231 controls the image output unit 239 to start output of image data to the recording unit 242. Starting output of image data includes outputting image data to the outside of the image capturing device 2 by means of wireless or wired communication via a communication IF (not illustrated). Subsequently, the flow proceeds to step S170.

When the flow proceeds to step S170, the suction-attachment detection unit 238 detects a load in the detaching direction applied from the outside. The suction-attachment detection unit 238 outputs a voltage signal corresponding to the magnitude of the load in the detaching direction applied from the outside to the bus line 241. When unable to detect a load in the detaching direction applied from the outside, the suction-attachment detection unit 238 does not have to output a voltage signal to the bus line 241. The suction-attachment determination unit 237 converts the accepted voltage signal and thereby acquires information on the magnitude of the load in the detaching direction applied from the outside and application duration of the load. Subsequently, the flow proceeds to step S180.

When the flow proceeds to step S180, the suction-attachment determination unit 237 determines whether or not a relationship between the suction-attachment unit 12 and the suction-attachment subject surface 9 satisfies a detachment condition. The detachment condition is a condition that is satisfied when the suction-attachment unit 12 is detached from the suction-attachment subject surface 9. In the present embodiment, the suction-attachment determination unit 237 determines whether or not a relationship between the magnitude and application duration of the load in the detaching direction detected by the suction-attachment detection unit 238 satisfies a predetermined detaching load condition. The detaching load condition is a condition that is satisfied when a load required for the suction-attachment unit 12 to be detached from the suction-attachment subject surface 9 is applied from the outside. When a relationship between the magnitude and application duration of the load in the detaching direction detected by the suction-attachment detection unit 238 satisfies the detaching load condition, the suction-attachment determination unit 237 determines that the detachment condition is satisfied.

For example, it can be defined that, when a load the magnitude of which is equal to or greater than a preset detaching load value (for example, 10 G) is applied in the detaching direction for a preset detaching duration (for example, 1 second), the detaching load condition is satisfied. Alternatively, it can be defined that, when a load is applied in the detaching direction in such a way that the product of the magnitude of the load and application duration of the load becomes equal to or greater than a preset detaching impulse value (for example, 100 N☐s), the detaching load condition is satisfied. In the examples described above, specific numerical values of the detaching load value, the detaching duration, and the detaching impulse value are determined with the structure, physical properties, and the like of the suction-attachment unit 12 taken into consideration. For example, the numerical values can be determined through physical simulation or preliminary experiment.

When a relationship between the magnitude of the load in the detaching direction and application duration of the load satisfies the above-described detachment condition (Yes in step S180), the suction-attachment determination unit 237 outputs a detachment signal to the bus line 241. The controller 231, when acquiring the detachment signal, stops the output of image data to the recording unit 242 and terminates the flow. On the other hand, when the relationship between the magnitude of the load in the detaching direction and application duration of the load does not satisfy the above-described detachment condition (No in step S180), the flow returns to step S110. In such a configuration, since no sooner is the image capturing device 2 detached from the suction-attachment subject surface 9 than the generation and the like of image data are stopped, it is possible to stop output of image data promptly.

By repeating steps S110 to S180, which have been described thus far, the image capturing device 2 is capable of promptly recording the surrounding environment when the camera unit 11 has moved. It should be noted that the present disclosure is not limited to the above-described embodiment and can be appropriately modified as long as the modification does not deviate from the scope of the present embodiment.

(Variations)

In the above-described embodiment, a case where the suction-attachment detection unit 238 detects a load in the suction-attaching direction applied from the outside was described. Hereinafter, as a variation of the embodiment, a case where the suction-attachment detection unit 238 detects an air pressure on the inner side of the suction cup 121 will be described.

In the variation, the suction-attachment detection unit 238 is, for example, an air pressure sensor of a piezoresistive type and is arranged on the inner side of the suction cup 121. The suction-attachment detection unit 238 detects an air pressure on the inner side of the suction cup 121 and outputs a voltage signal corresponding to the magnitude of detected air pressure to the bus line 241 by means of wireless or wired communication.

On this occasion, in step S110, the suction-attachment detection unit 238 detects a pressure on the inner side of the suction cup 121. When the suction cup 121 is suction-attached on the suction-attachment subject surface 9, the suction-attachment detection unit 238 detects a pressure in the sealed space 91. The suction-attachment detection unit 238 outputs a voltage signal corresponding to the pressure on the inner side of the suction cup 121 to the bus line 241. In step S110, when the pressure on the inner side of the suction cup 121 is equal to or greater than a preset pressure (for example, $9 \times 10^4$ Pa), the suction-attachment detection unit 238 does not have to output a voltage signal to the bus line 241. The suction-attachment determination unit 237 converts the accepted voltage signal and thereby acquires the magnitude of the pressure on the inner side of the suction cup 121. Subsequently, the flow proceeds to step S120.

When the flow proceeds to step S120, the suction-attachment determination unit 237 determines whether or not the pressure detected by the suction-attachment detection unit 238 satisfies a suction-attaching pressure condition. In the present embodiment, the suction-attaching pressure condition is a condition that is satisfied when the pressure on the inner side of the suction cup 121 reaches a pressure required for the suction-attachment unit 12 to suction-attach on the suction-attachment subject surface 9. When the pressure detected by the suction-attachment detection unit 238 satisfies the suction-attaching pressure condition, the suction-attachment determination unit 237 determines that the suction-attachment condition is satisfied.

For example, it can be defined that, when the pressure detected by the suction-attachment detection unit 238 is equal to or less than a preset suction-attaching pressure value (for example, $5 \times 10^4$ Pa), the suction-attaching pressure condition is satisfied. In the examples described above, a specific numerical value of the suction-attaching pressure value is determined depending on the structure, physical properties, and the like of the suction-attachment unit 12. For example, the numerical value can be determined through physical simulation or preliminary experiment.

When the pressure detected by the suction-attachment detection unit 238 satisfies the above-described suction-attachment condition (Yes in step S120), the suction-attachment determination unit 237 outputs a suction-attachment signal to the bus line 241 and the flow proceeds to step S130. On the other hand, when the pressure detected by the suction-attachment detection unit 238 does not satisfy the above-described suction-attachment condition (No in step S120), the flow returns to step S110.

Since steps S130 to S160 in the variation are the same as those in the above-described embodiment, descriptions thereof will be omitted.

In the variation, when the flow proceeds to step S170, the suction-attachment detection unit 238 detects a pressure on the inner side of the suction cup 121. When the suction cup 121 is suction-attached on the suction-attachment subject surface 9, the suction-attachment detection unit 238 detects a pressure in the sealed space 91. The suction-attachment detection unit 238 outputs a voltage signal corresponding to the magnitude of the pressure on the inner side of the suction cup 121 to the bus line 241. The suction-attachment determination unit 237 converts the accepted voltage signal into information on voltage values and application duration and thereby acquires information on the magnitude of the pressure on the inner side of the suction cup 121. Subsequently, the flow proceeds to step S180.

When the flow proceeds to step S180, the suction-attachment determination unit 237 determines whether or not the pressure detected by the suction-attachment detection unit 238 satisfies a predetermined detaching pressure condition. The detaching pressure condition is a condition that is satisfied when the pressure on the inner side of the suction cup 121 reaches a pressure causing the suction-attachment unit 12 to be detached from the suction-attachment subject surface 9, that is, a preset pressure. When the pressure detected by the suction-attachment detection unit 238 satisfies the detaching pressure condition, the suction-attachment determination unit 237 determines that the detachment condition is satisfied.

For example, it can be defined that, when the pressure detected by the suction-attachment detection unit 238 in step S170 is equal to or greater than a preset detaching pressure value (for example, $9 \times 10^4$ Pa), the detaching pressure condition is satisfied. In the example, a specific numerical value of the detaching pressure value is determined depending on the structure, physical properties, and the like of the suction-attachment unit 12. For example, the numerical value can be determined through physical simulation or preliminary experiment.

When the pressure detected by the suction-attachment detection unit 238 in step S170 satisfies the above-described detaching pressure condition (Yes in step S180), the suction-attachment determination unit 237 outputs a detachment signal to the bus line 241. The controller 231, when acquiring the detachment signal, stops the output of image data to the recording unit 242 and terminates the flow. On the other hand, when the pressure detected by the suction-attachment detection unit 238 in step S170 does not satisfy the above-described detachment pressure condition (No in step S180), the flow returns to step S110. Even in such a configuration, since no sooner is the image capturing device 2 detached from the suction-attachment subject surface 9 than the generation and the like of image data are stopped, it is possible to stop output of image data promptly.

By repeating steps S110 to S180, which have been described thus far, the image capturing device 2 according to the above-described variation is capable of promptly recording the surrounding environment when the image capturing device 2 including the camera unit 11 has moved.

In addition, although, in the above-described embodiment, in order to describe an image capturing device according to the present disclosure, the description was made using as an example a device configured to capture images of a surrounding environment on the outside through a suction-attachment subject surface, the image capturing device according to the present disclosure is not limited to the above-described example. That is, the image capturing device according to the present disclosure may be a device configured to capture images of a surrounding environment in the opposite direction to the suction-attaching direction or the vertical direction. Even in such a device, by having a configuration equivalent to the camera unit 11 and the control unit 23 described above and repeating processing in steps S110 to S180, the image capturing device is capable of promptly recording a surrounding environment when the camera unit 11 has moved.

In addition, in the above-described embodiment, when, after it is determined that the pressure detected by the suction-attachment detection unit 238 in steps S110 to S180 does not satisfy the above-described detaching pressure condition (No in step S180), the processing from step S110 onward is repeated again, the processing in step S120 in the second or later round may be appropriately omitted within an extent not impairing advantageous effects of the present disclosure. When, in the processing in the second or later round, the suction-attachment condition in step S120 and the brightness condition in step S140 are satisfied, omitting the processing in the steps and determining whether or not the camera unit 11 is moving in step S150 enables the control flow to be simplified.

In addition, when the brightness determination unit 240 monitors change in the brightness even after, in step S140, it is determined that the brightness criterion is satisfied and a sudden change in the brightness occurs due to entrance or exit into or from a tunnel while image data are output, the output of image data does not have to be stopped. Further, when the brightness does not recover for a predetermined period of time measured by the timer of the CPU, which will be described later, the output of image data may be stopped.

In addition, in the above-described embodiment, a configuration was described in which the controller 231 starts output of image data to the recording unit 242 when, after the suction-attachment determination unit 237 determines that the suction-attachment condition is satisfied in step S120, the brightness determination unit 240 further determines that the brightness criterion is satisfied in step S140 and the movement determination unit 236 determines that the camera unit 11 is moving in step S150, resulting in all the conditions being determined to be satisfied.

However, the determination of whether or not the suction-attachment condition is satisfied, the determination of whether or not the brightness criterion is satisfied, and the determination of whether or not the camera unit 11 is moving do not have to be performed in this order. For example, even when the suction-attachment determination unit 237 has not determined that the suction-attachment condition is satisfied, the movement determination unit 236 may first determine whether or not the camera unit 11 is moving and, subsequently, the suction-attachment determination unit 237 may determine that the suction-attachment condition is satisfied. In this configuration, when, after the movement determination unit 236 has determined that the camera unit 11 is moving or at the same time when the movement determination unit 236 determines that the camera unit 11 is moving, the suction-attachment determination unit 237 determines that the brightness criterion is satisfied and the suction-attachment condition is satisfied, the controller 231 may start output of image data to the recording unit 242.

In addition, in the above-described embodiment, the image capturing device 2 may further include an acceleration sensor configured to acquire an acceleration of the camera unit 11. The acceleration sensor is, for example, a capacitance detection type acceleration sensor. In this case, the acceleration sensor outputs an electric signal corresponding to the detected acceleration to the movement determination unit 236. The movement determination unit 236 converts the electric signal acquired from the acceleration sensor into information of acceleration. The movement determination unit 236 integrates the acquired acceleration and thereby calculates a speed of the camera unit 11 and, when the speed is equal to or greater than a predetermined speed criterion value, determines that the camera unit 11 has moved. In this case, the movement determination unit 236 is not required to perform image processing as described in the above-described embodiment. In addition, in this case, even when the surrounding environment and the camera unit are moving at the same speed, the movement determination unit 236 can detect that the camera unit 11 is moving. Note that, the speed criterion value in the example is determined depending on precision and the like of the acceleration sensor and can be determined through physical simulation or preliminary experiment.

In addition, in the above-described embodiment, the image capturing device 2 may further include a signal acquisition unit configured to acquire an external signal relating to information on speed and a position. The external signal is, for example, a GPS signal or a signal that can be obtained through an on-vehicle network, such as a controller area network (CAN). In this case, the movement determination unit 236 converts the external signal acquired by the signal acquisition unit into speed information of the image capturing device 2 and, when the speed of the image capturing device 2 is equal to or greater than a predetermined speed criterion value, determines that the camera unit has moved. In this case, the movement determination unit 236 is also not required to perform image processing as described in the above-described embodiment.

In addition, although, in the above-described embodiment, a case where the controller 231 of the image capturing device 2 makes the camera unit operate when determining that the suction-attachment condition is satisfied was described, the camera unit 11 may be configured to constantly operate. Alternatively, the camera unit 11 may start operation through a start-up operation by the user.

Note that, in the above-described embodiment, it is preferable to include a condition requiring application duration of a load to be equal to or longer than a preset suction-attaching duration in the suction-attaching load condition. Such a configuration enables the image capturing device 2 to be prevented from malfunctioning when a load in the suction-attaching direction is instantaneously applied, such as when the image capturing device 2 hits some object.

In addition, in the above-described embodiment, it is preferable to include a condition requiring application duration of a load to be equal to or longer than a preset detaching duration in the detaching load condition. Such a configuration enables the image capturing device 2 to be prevented from malfunctioning when a load in the detaching direction is instantaneously applied, such as when the image capturing device 2 hits some object.

In addition, although, in the above-described embodiment, a case where a load in the suction-attaching direction applied to the image capturing device 2 from the outside is detected and an example in which the suction-attachment detection unit 238 detects pressure on the inner side of the suction cup were described, the physical quantity that the suction-attachment detection unit detects is not limited to the examples. The suction-attachment detection unit 238 may be a detection unit that detects a physical quantity other than a load in the suction-attaching direction and pressure as long as detecting a physical quantity representing a relationship between the suction-attachment unit 12 and the suction-attachment subject surface 9.

For example, the suction-attachment detection unit 238 may be a distance sensor configured to detect a distance between the camera unit 11 and the suction-attachment subject surface 9. On this occasion, the suction-attachment detection unit 238 outputs a distance signal corresponding to the detected distance to the bus line. The suction-attachment determination unit 237 converts the distance signal accepted from the suction-attachment detection unit 238 and thereby acquires the distance that the suction-attachment detection unit 238 detected. When the distance is equal to or less than a preset suction-attaching distance (for example, 1 cm), the suction-attachment determination unit 237 can determine that the suction-attachment condition is satisfied. Note that a specific numerical value of the suction-attaching distance is determined with the position of the suction-attachment detection unit and the structure, physical properties, and the like of the suction-attachment unit taken into consideration and can be determined through physical simulation or preliminary experiment.

In addition, in the example, when the distance is equal to or greater than a preset detaching distance (for example, 5 cm), the suction-attachment determination unit 237 can determine that the detachment condition is satisfied. Note that a specific numerical value of the detaching distance is determined with the position of the suction-attachment detection unit 238 and the structure, physical properties, and the like of the suction-attachment unit 12 taken into consideration and can be determined through physical simulation or preliminary experiment.

The embodiments and their variations described above can be embodied independently or in an appropriate combination thereof. The plurality of embodiments and variations have novel features that differ from one another. Therefore, the plurality of embodiments and variations contribute to achieving objects or solving problems that differ from one another and contribute to attaining advantageous effects that differ from one another.

In addition, in the above-described embodiments, the respective components described in the drawings as functional blocks performing various processing can be constituted by a CPU, a memory, and other circuits in the hardware aspect and are achieved by programs and the like loaded on the memory in the software aspect. Therefore, it is understandable for a person skilled in the art that the functional blocks can be achieved in various manners, such as by only hardware, by only software, and by a combination thereof, and the achievement manner is not limited to any manner.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. An image capturing device comprising:
a camera configured to capture images of a surrounding environment and generate image data;
a suction-attachment unit comprising a suction cup and a housing, the housing configured to support the camera and the suction cup configured to be fixed on a suction-attachment subject surface by a user;
at least one memory configured to store a program; and
at least one central processing unit (CPU) communicatively coupled to the camera, suction-attachment unit, and the memory, the CPU configured to execute the program stored in the memory to:
determine whether or not the image data can be output to a recording unit; and
control output of the image data to the recording unit, based on the determination whether or not the image data can be output to the recording unit,
wherein the determination whether or not the image data can be output to the recording unit comprises:
determining whether or not brightness of a frame image generated based on the image data satisfies a brightness criterion; and
determining whether or not a relationship between the suction cup and the suction-attachment subject surface satisfies a predetermined suction-attachment condition.

2. The image capturing device according to claim 1, wherein the determination whether or not the image data can be output to the recording unit includes:
determining whether or not the camera has moved.

3. The image capturing device according to claim 2, wherein the at least one CPU is further configured to start output of the image data to the recording unit when the suction-attachment condition is satisfied, the brightness criterion is satisfied, and the camera has moved.

4. The image capturing device according to claim 2, wherein the at least one CPU is further configured to stop output of the image data to the recording unit when the camera does not move.

5. The image capturing device according to claim 2, wherein the at least one CPU is further configured to detect a physical quantity representing a relationship between the suction cup and the suction-attachment subject surface,
wherein the suction cup is fixed on the suction-attachment subject surface by being pressed in a suction-attaching direction from an outside,
the at least on CPU is configured to:
detect a load in the suction-attaching direction applied from the outside, and
determine that the suction-attachment condition is satisfied when a relationship between a magnitude and application duration of a load in the suction-attaching direction detected by the at least one CPU satisfies a predetermined suction-attaching load condition.

6. The image capturing device according to claim 2, wherein the at least one CPU is further configured to detect a physical quantity representing a relationship between the suction cup and the suction-attachment subject surface,
wherein the suction cup is fixed on the suction-attachment subject surface by a decompressed sealed space being formed between the suction cup and the suction-attachment subject surface,
the at least one CPU is configured to:
detect a pressure in the sealed space, and
determine that the suction-attachment condition is satisfied when pressure detected by the at least one CPU satisfies a predetermined suction-attaching pressure condition.

7. The image capturing device according to claim 2, wherein
the at least one CPU is further configured to:

determine whether or not a relationship between the suction cup and the suction-attachment subject surface satisfies a predetermined detachment condition, and stop output of the image data to the recording unit when the at least one CPU determines that the detachment condition is satisfied.

8. The image capturing device according to claim 5, wherein the at least one CPU is configured to:

not start output of the image data to the recording unit when the brightness of the frame image does not satisfy a predetermined brightness criterion, even when a relationship between a magnitude and application duration of a load in the suction-attaching direction detected by the at least one CPU satisfies a start condition.

9. An image capturing device comprising:

a camera configured to capture images of a surrounding environment and generate image data;

a suction-attachment unit comprising a suction cup and a housing, the housing configured to support the camera and the suction cup configured to be fixed on a suction-attachment subject surface by a user;

at least one memory configured to store a program; and at least one central processing unit (CPU) communicatively coupled to the camera, suction-attachment unit, and the memory, the CPU configured to execute the program stored in the memory to:

determine whether or not the image data can be output to a recording unit;

control output of the image data to the recording unit, based on a determination result by the determination unit; and detect a load in a detaching direction applied from an outside, wherein the at least one CPU is configured to output of the image data to the recording unit when a relationship between a magnitude and application duration of a load in the detaching direction detected by the at least one CPU satisfies a predetermined stop condition.

10. An image capturing method comprising:

a step of, after a camera is fixed on a suction-attachment subject surface by using a suction cup, capturing images of a surrounding environment with the camera and generating image data;

a step of determining whether or not the image data can be output to a recording unit; and a step of controlling output of the image data to the recording unit, based on a determination result, wherein the step of determining includes:

determining whether or not brightness of a frame image generated based on the image data satisfies a brightness criterion; and determining whether or not a relationship between the suction-attachment unit and the suction-attachment subject surface satisfies a predetermined suction-attachment condition.

* * * * *